(12) United States Patent
Ishikawa et al.

(10) Patent No.: US 6,972,738 B2
(45) Date of Patent: Dec. 6, 2005

(54) IMAGE DISPLAYING APPARATUS

(75) Inventors: Masaru Ishikawa, Tokorozawa (JP); Hiroshi Toriumi, Tokorozawa (JP)

(73) Assignee: Pioneer Corporation, Tokyo (JP)

(*) Notice: Subject to any disclaimer, the term of this patent is extended or adjusted under 35 U.S.C. 154(b) by 310 days.

(21) Appl. No.: 10/299,862

(22) Filed: Nov. 20, 2002

(65) Prior Publication Data
US 2003/0095079 A1 May 22, 2003

(30) Foreign Application Priority Data
Nov. 22, 2001 (JP) ............................. 2001-357073

(51) Int. Cl.$^7$ ............................................. G09G 3/00
(52) U.S. Cl. .......................... 345/32; 345/9; 345/419; 348/58
(58) Field of Search ....................... 345/7–9, 108–109, 345/32; 348/58

(56) References Cited

U.S. PATENT DOCUMENTS

| | | | | |
|---|---|---|---|---|
| 5,468,540 A | * | 11/1995 | Lu | 428/156 |
| 5,717,424 A | * | 2/1998 | Simson et al. | 345/110 |
| 6,069,650 A | * | 5/2000 | Battersby | 348/59 |
| 2001/0022562 A1 | * | 9/2001 | Ishikawa | 345/9 |
| 2001/0022563 A1 | | 9/2001 | Ishikawa | |
| 2003/0151603 A1 | * | 8/2003 | Kobayashi | 345/419 |

FOREIGN PATENT DOCUMENTS

| | | |
|---|---|---|
| CA | 2121054 A | 10/1995 |
| EP | 1 275 999 A1 | 1/2003 |
| JP | 4-106541 | 4/1992 |
| JP | 2000-352606 | 12/2000 |
| JP | 2001-255493 | 9/2001 |
| JP | 2001-255494 | 9/2001 |
| WO | WO 01/63340 A1 | 8/2001 |

* cited by examiner

Primary Examiner—Alexander Eisen
Assistant Examiner—Kimnhung Nguyen
(74) Attorney, Agent, or Firm—McGinn IP Law Group, PLLC

(57) ABSTRACT

An image display machine includes a first planar display to present a two-dimensional image. The two-dimensional image includes an object image. The display machine also includes an image transmitting panel which has a micro lens array. The image transmitting panel is placed in parallel to the first display. The micro lens array includes a plurality of lenses, and has an effective area greater than the object image. The image transmitting panel creates an imaging plane to show a real image of the two-dimensional image on the side opposite the first display. The display machine further includes a second display to present a background image. The second display is located between the imaging plane and the micro lens array. The second display has a transparent or semitransparent area. The display machine has a simple structure, but is able to display the two-dimensional image stereoscopically.

25 Claims, 10 Drawing Sheets

IMAGE DISPLAYING APPARATUS

BACKGROUND OF THE INVENTION

1. Field of the Invention

The present invention relates to an apparatus for displaying a two-dimensional image of an object including a three-dimensional article.

2. Description of the Related Art

In order to provide and even enhance a visual healing effect and/or an attractive appearance of merchandise in a store, an apparatus for making a three-dimensional image is often used. Such apparatus is for example used for interior decorations and sample articles placed in a showcase.

A lenticular lens method is used for providing a three-dimensional image. The lenticular lens method makes a plurality of latent images in a single screen, and these latent images are viewed through a transmission screen, which is referred to as a lenticular lens. The lenticular lens is made from a plurality of semi-cylindrical lenses having the same width and arranged (connected to each other) in a horizontal direction. When the latent images are viewed behind the lenticular lens, a three-dimensional image is observed. Specifically, each of the latent images is divided into a plurality of stripe images such that each stripe image corresponds to one pitch of the semi-circular lenses. Each stripe image extends in a vertical direction. The stripe images are regularly arranged. A focus point of the lenticular lens changes depending upon a direction of viewing the screen and a distance from a viewer to the screen. Thus, an observed image changes. This provides the viewer with a three-dimensional image. More specifically, the viewer recognizes a three-dimensional image when two images (right and left images) corresponding to the eyes of the viewer are divided into two groups of alternately arranged stripe images. The lenticular lens method can also provide a moving image (referred to as "motion effect"). Further, the lenticular lens method can provide a flip effect, which switches the observed image several times when the viewer walks around the lenticular lens.

In order to make a plurality of latent images on a single surface, however, binocular parallax images are needed when preparing the latent images. A lot of labor is required to make the binocular parallax images, such as computerized image processing, lenticular lens preparation, and appropriate and accurate selection (combination) of the lens and images. Therefore, a display apparatus tends to be expensive if the display apparatus utilizes the lenticular lens to provide a stereoscopic image.

When a stereoscopic image is displayed by the lenticular lens, an original image should be viewed from two or more directions and divided into a plurality of strip images. These strip images are special images. Therefore, there is a demand for an image display apparatus which can provide a stereoscopic image from a general photograph or picture and which does not have to observe the object from a plurality of directions.

SUMMARY OF THE INVENTION

An object of the present invention is to provide an image displaying apparatus that has a simple structure but is able to show an object image stereoscopically.

According to one aspect of the present invention, there is provided an image displaying apparatus comprising: a first display having a first planar image surface to present a two-dimensional image including an object image; an image transmitting panel in parallel to the first image surface and having a micro lens array for creating an imaging plane to show a real image of the two-dimensional image in a space opposite the first display, the micro lens array having a plurality of lenses and having an effective area greater than the object image; and a second display between the imaging plane and the micro lens array for presenting a background image, the second display having a transparent or semi-transparent area to allow formation of the real image on the imaging plane.

The first and second displays are situated on opposite sides of the micro lens array, and the micro lens array creates the real image of the two-dimensional image on the imaging plane over the background image of the second display. Therefore, the apparatus has a simple structure, but is able to show the object image stereoscopically.

The micro lens array may be a micro convex lens plate having a plurality of pairs of lenses arranged two-dimensionally such that optical axes of the pairs of lenses extend in parallel to each other. Two lenses in each lens pair may be convex lenses and may be coaxial to each other.

The micro lens array may create an erected image on the imaging plane.

The first display may include a back light, and a reversal film placed between the back light and the image transmitting panel to present the two-dimensional image.

The apparatus may further include a first film drive mechanism for translating the reversal film relative to the image transmitting panel. A distance between the reversal film and the image transmitting panel may be substantially maintained.

The apparatus may further include a second film drive mechanism for moving the reversal film relative to the image transmitting panel to change the distance between the reversal film and the image transmitting panel while the first drive mechanism is translating the reversal film. The moving direction may be generally perpendicular to the translating direction.

The second film drive mechanism may only partially change the distance between the reversal film and the image transmitting panel.

The apparatus may further include a mechanism for pivoting the image transmitting panel relative to the reversal film.

The apparatus may further include a panel drive mechanism for moving the image transmitting panel relative to the reversal film to change the distance between the reversal film and the image transmitting panel.

The apparatus may further include a third display located at the imaging plane or between the imaging plane and the second display for presenting a second background image including a transparent or semi-transparent area to facilitate recognition of the real image of the two-dimensional image.

The apparatus may further include a transparent member for supporting the third display.

The reversal film, the image transmitting panel and the second display may have a hollow cylindrical shape with an increasing diameter, respectively. The reversal film, the image transmitting panel and the second display may be arranged coaxially.

The transparent member may have a hollow cylindrical shape and may be coaxial to the image transmitting panel.

DETAILED DESCRIPTION OF THE INVENTION

Embodiments of the present invention will be described with reference to the accompanying drawings.

Figure 1:
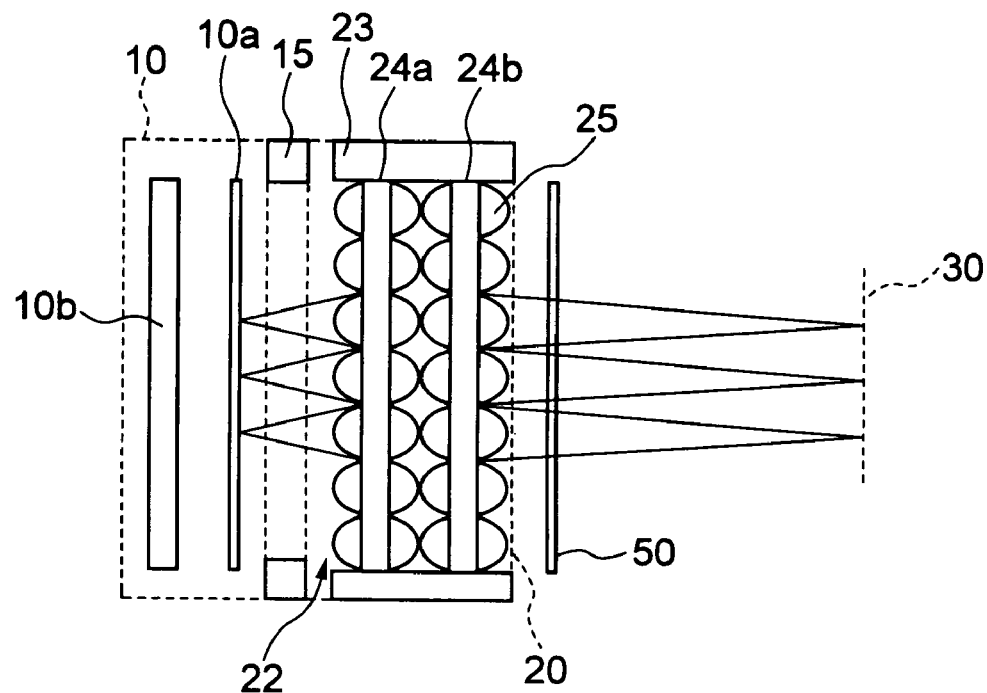
FIG. 1 is a schematic view showing major elements of an image display apparatus according to a first embodiment of the present invention.

Referring to FIG. 1, an apparatus for displaying a two-dimensional image of an object including a three-dimensional article is schematically illustrated. The apparatus includes a first display 10, and an image transmitting panel 20 supported by a support 15 secured to the first display 10. The first display 10 includes a reversal film 10a and a back light 10b. The reversal film 10a is a planar image (display) surface, such as an expanded positive, an expanded positive filmslide, and a transparent film having transmissive color printed thereon. The back light 10b illuminates the reversal film 10a from behind. The reversal film 10 contains a two-dimensional mage. The two-dimensional image illuminated by the back light 10b is imaged through the image transmitting panel 20 so that an imaging plane 30 is created in the space on the side opposite the first display 10. The apparatus also includes a second display 50 located between the imaging plane 30 and the image transmitting panel 20.

The image transmitting panel 20 includes a micro lens array 22 and a lens frame 23. The lens frame 23 surrounds an effective area of the micro lens array 22. The support 15 supports the lens frame 23, and the image transmitting panel 20 is spaced in parallel from an image surface of the reversal film 10a. The micro lens array 22 is an optical system to show a viewer a two-dimensional image of an object such as a stereo-image of the reversal film. The micro lens array 22 creates an erected image of the two-dimensional image at 100% magnification. The micro lens array 22 has an effect area larger than an object in the two-dimensional image. The micro lens array 22 includes a plurality of convex lenses 25.

Figure 2:
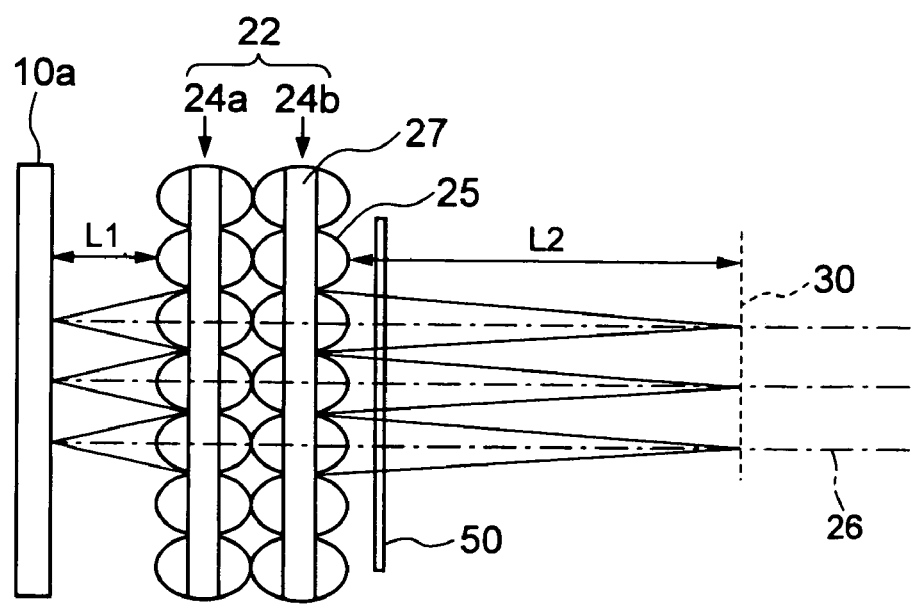
FIG. 2 illustrates a cross sectional view of a micro lens array employed in the apparatus shown in FIG. 1.

Referring to FIG. 2, the micro lens array 22 is illustrated in a cross sectional view as cut by a plane including optical axes 26 of the convex lenses 25. The micro lens array 22 includes a plurality of micro lenses 25 arranged two dimensionally. The micro lens array 22 has two array halves 24a and 24b connected to each other by spacers (not shown). The micro lens array 22 is a plate of micro convex lenses. This micro convex lens plate has a plurality of pairs of convex lenses 25 arranged two dimensionally such that the pairs of convex lenses 25 have parallel optical axes 26 relative to each other. Each pair of convex lenses has a mutual optical axis 26. Each pair of convex lenses 25 has a focus point, and the combination of the focus points of all the pairs of convex lenses 25 defines the imaging plane 30.

In FIG. 2, if the radius of curvature of each convex lens 25 on the left side of the lens array half 24a (24b) is smaller than that of the convex lens 25 on the right side of the lens array half 24a (24b), the distance L1 between the lens plane of the left array half 24a and the reversal film 10a is shorter than the distance L2 between the lens plane of the right array half 24b and the focus point of the right array half 24b (or the imaging plane 30). In this case, the imaging plane 30 is sufficiently spaced from the image transmitting panel 20, and the thickness of the apparatus can be reduced. The convex lenses 25 are made from the same material and have the same shape. For example, the convex lenses 25 are arranged close to each other on a transparent plate 27 in a matrix fashion. The optical axis 26 of one convex lens 25 on the left array half 24a is coaxial to the optical axis 26 of an adjacent convex lens 25 on the right array half 24b. In this embodiment, the convex lenses 25 and the transparent plate 27 are made from acrylic. It should be noted that the transparent plate 27 may be made from a transmissive material such as glass.

It should be noted that the back light 10b may be replaced by a reflection type illumination unit, which illuminates the reversal film 10a from the front, not from the back. Such illumination unit may be supported by the support 15 between the reversal film 10a and the micro lens array 22.

Figure 3A:
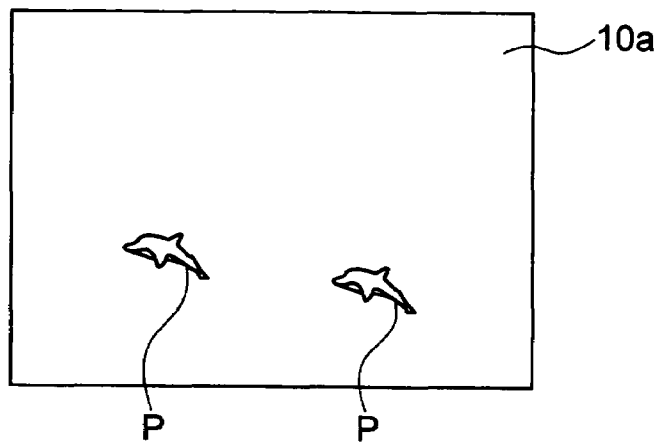
FIG. 3A illustrates a first reversal film used in the apparatus shown in FIG. 1.
Figure 3B:
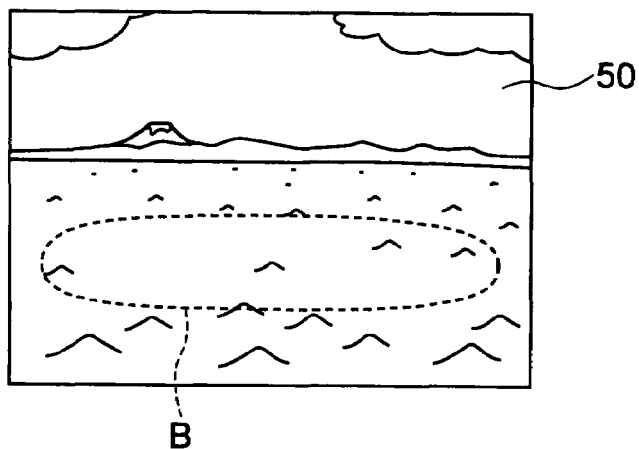
FIG. 3B illustrates a second reversal film used in the apparatus shown in FIG. 1.
Figure 3C:
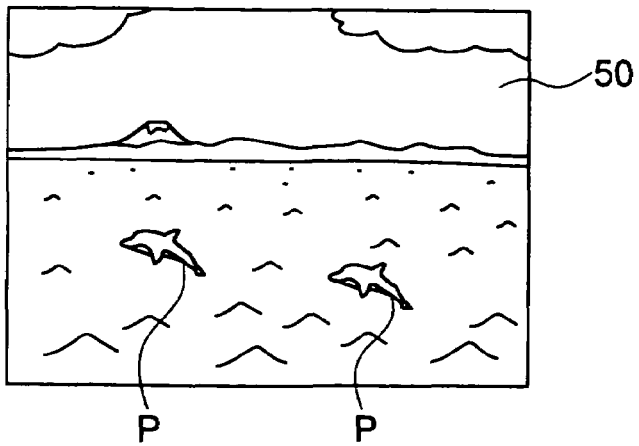
FIG. 3C illustrates a combined image which a viewer perceives.

Referring to FIG. 3A, the reversal film 10a of the first display unit 10 includes images of objects P such as three-dimensional animals, which are expected to be viewed by a viewer. Other parts of the reversal film 10a are transmissive two-dimensional images. The second display 50 situated between the imaging plane 30 and the image transmitting panel 20 is a second reversal film to display a background image. Preferably, as shown in FIG. 3B, the background image of the second reversal film 50 has a transparent or semitransparent area B to ensure proper displaying of an actual image of the object P. The area B allows passage of a sufficient amount of light from the reversal film 10a. As shown in FIG. 3C, therefore, the viewer feels that only the objects P (actual images) of the first reversal film 10a float on or project from the background image of the second reversal film 50, like a three-dimensional image. It should be noted that the entire background image of the second reversal film 50 may be semitransparent. Further, the second reversal film 50 may be in contact with the micro lens array 22 or spaced from the micro lens array 22 as long as the second reversal film 50 is placed between the imaging plane 30 and the micro lens array 22.

A second embodiment of the present invention will be described with reference to FIG. 4. Similar reference numerals are used to designate similar elements in the first and second embodiments and detailed description of similar elements may be omitted.

The image displaying apparatus of this embodiment is placed on a stage (not shown). The reversal film 10a and the back light 10b of the first display unit 10 stand in parallel to each other. The first display unit 10 is received in a housing 40. The housing 40 has a space 43 for accommodating various elements such as a drive mechanism. The two-dimensional image of the first display 10 includes an image of the object P and a surrounding section. Preferably the surrounding section emits white light. Preferably, the object image P is an image of a movable object rather than a static object. It should be noted that the first display 10 is not limited to the reversal film illuminated by the lighting unit. For instance, the first display 10 may be a color LCD (liquid crystal display) panel, a CRT (cathode ray tube) display, a plasma display, or an organic electroluminescence display. When the first display 10 is an electrically driven device, the first display 10 may be connected to an image signal source such that the first display 10 will receive an image signal to display a two-dimensional image including the three-dimensional object image P.

When the electrically driven device is utilized as the first display 10, the first display 10 makes the surrounding section of the object image P black. When the back light 10b is not used and a reflection type illumination unit is used, both of the object image P and the surrounding section are preferably non-transmissive.

Figure 5:
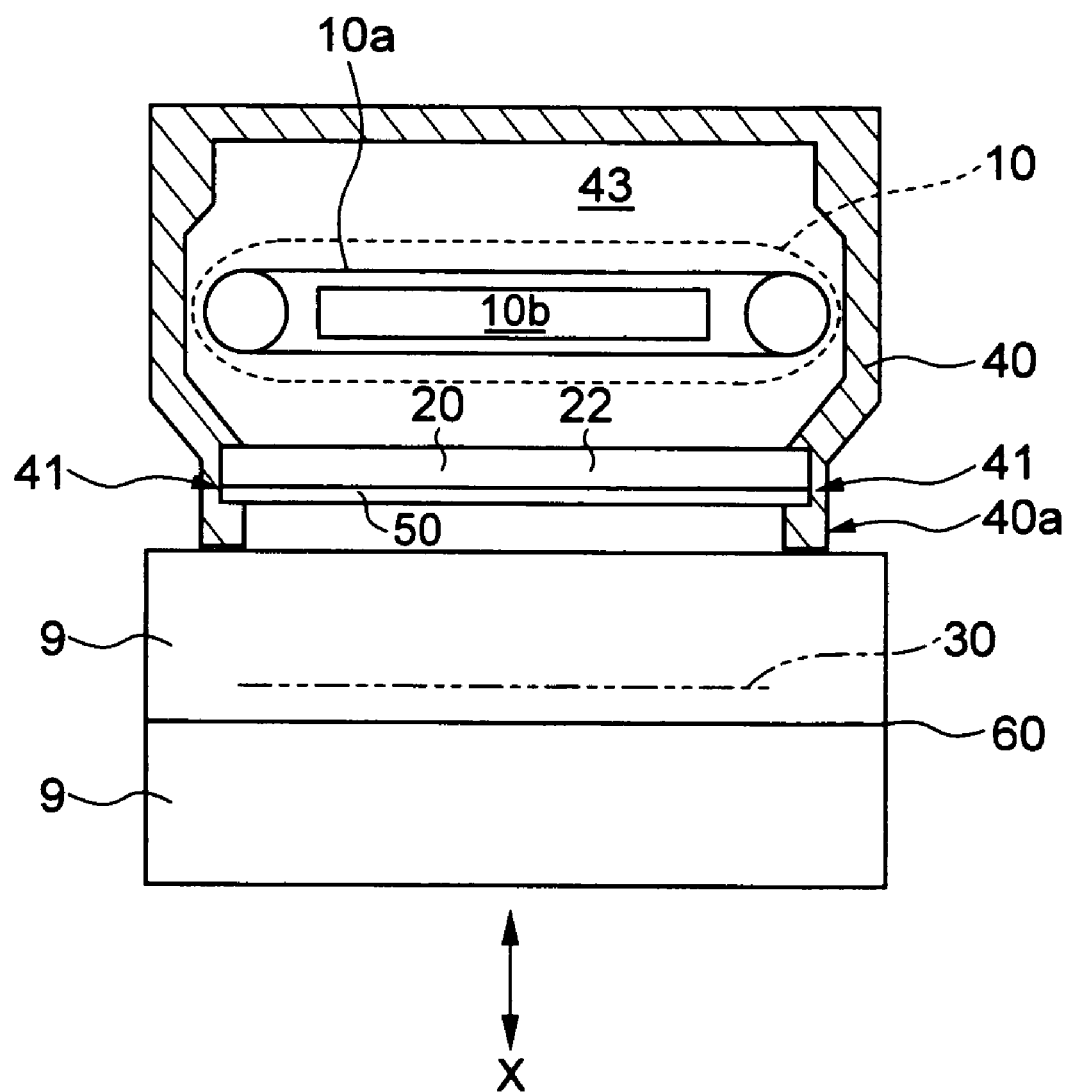
FIG. 5 illustrates a cross sectional view taken along the line 5—5 in FIG. 4.

The image transmitting panel 20 is supported in a front window 40a of the housing 40 such that the image transmitting panel 20 is spaced from the reversal film 10a, as best seen in FIG. 5. The second reversal film 50 is also supported in the front window 40a. Specifically, the second reversal film 50 firmly fits in a slit 41 formed in the front window 40a. The second reversal film 50 is the second display to provide the background image. It should be noted that a transmissive adhesive may be applied to a surface of the second reversal film 50 to adhere the second reversal film 50 to the image transmitting panel 20. In this configuration, no slit 41 may be necessary. The second reversal film 50 is detachable, and located between the image transmitting panel 20 and the viewer. The inside of the housing 40 (particularly those parts of the housing which are relatively close to the viewer) has a dark color, such as black, to prevent intrusion of unnecessary light.

The first reversal film 10a or the image display plane of the first display 10 is positioned within a "depth of field" around the focus point of the micro lens array 22 of the image transmitting panel 20 on the object side. When the object image on the display surface 10a of the first display 10 is illuminated by the back light, a projected picture of the object image is formed on the imaging plane 30 at or near the focus point of the micro lens array 22 on the viewer side. As a result, the viewer can recognize a real image of the object image P when the viewer sees the imaging plane 30 in an optical axis direction or in a similar direction. In this case, the object image formed on the reversal film 10a of the first display 10 is reproduced as the real image recognized by the viewer.

Figure 4:
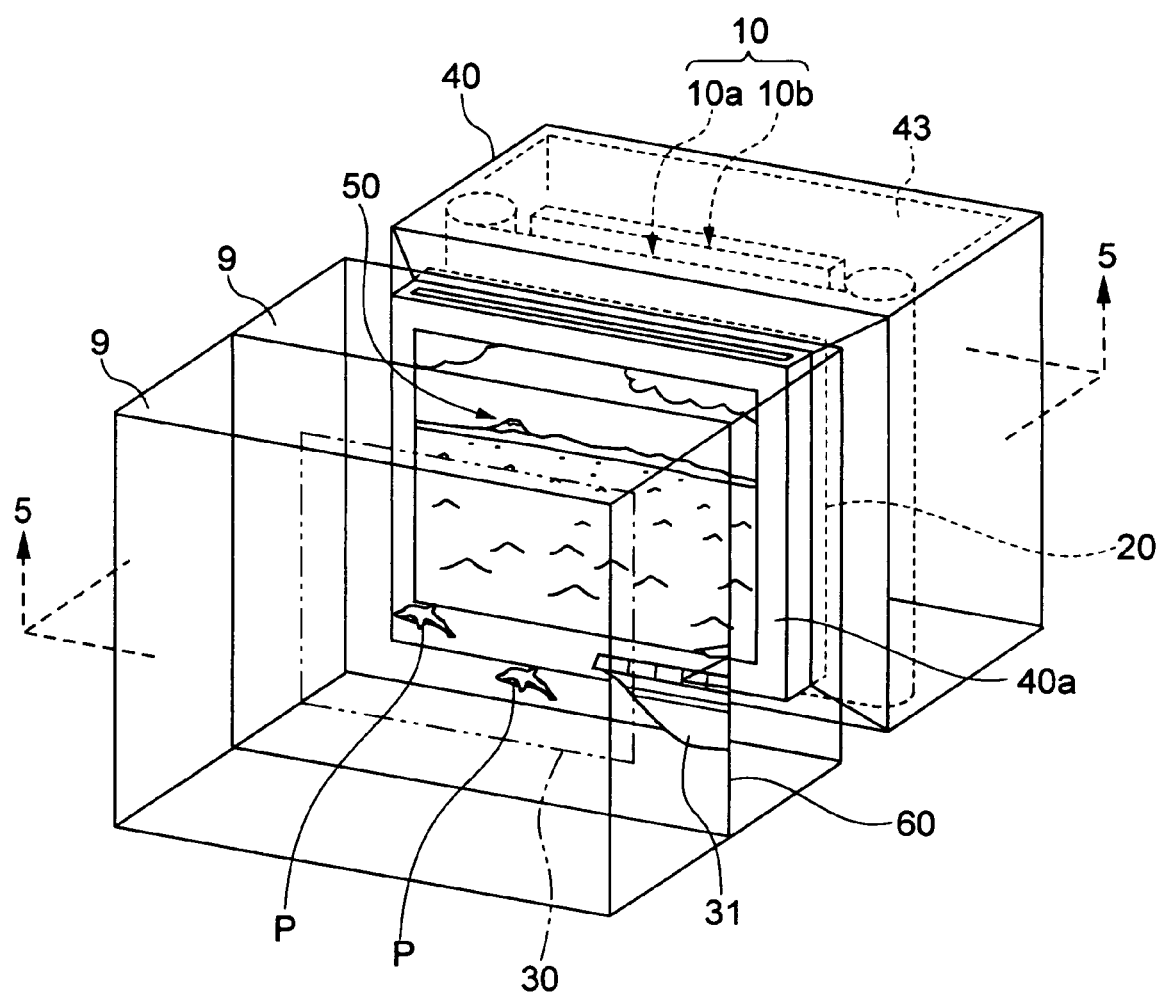
FIG. 4 is a schematic perspective view of an image display apparatus according to a second embodiment of the present invention.

As shown in FIGS. 4 and 5, a transparent body 9 is placed in front of the front window portion 40a of the housing 40. The transparent body 9 is an acrylic block having a rectangular parallelepiped shape. The thickness of the acrylic block 9, when viewed from the viewer, is determined such that the imaging plane 30 created by the micro lens array 22 is present inside the acrylic block 9. In other words, the thickness of the acrylic block 9 is determined such that the focus length of the micro lens array 22 does not exceed the thickness of the acrylic block 9. The viewer feels that the object image P "floats" in the acrylic block 9. It should be noted that two identical acrylic blocks 9 may be provided in tandem as shown in FIG. 5. A third display 60 is sandwiched between the two acrylic blocks 9. The third display 60 presents a second background image 31 (FIG. 4). The thickness of the acrylic block 9 is determined such that the third display 60 is located in the vicinity of the focus point of the micro lens array 22. The imaging plane 30 is therefore formed at or near the third display 60.

Figure 6A:
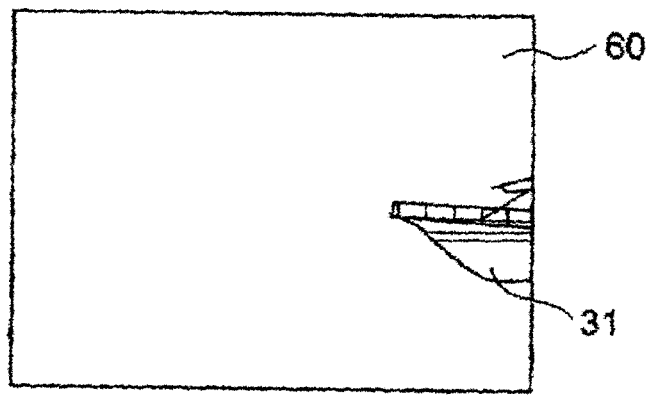
FIG. 6A illustrates a third reversal film used in the apparatus shown in FIG. 4.
Figure 6B:
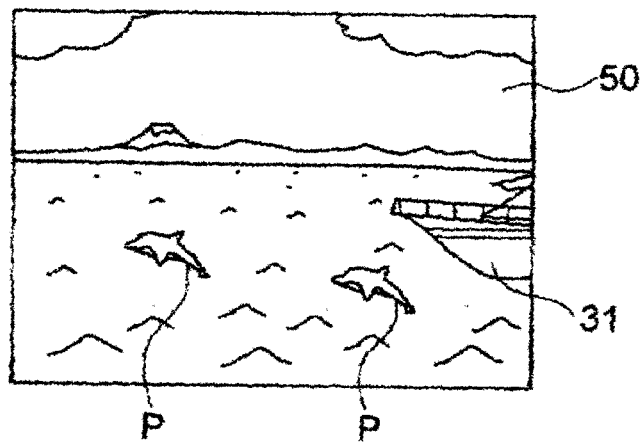
FIG. 6B illustrates a combined image which a viewer perceives.

Referring to FIG. 6A, the reversal film of the third display 60 situated near the imaging plane 30 includes the second background image 31 and a surrounding section. The second background image 31 is a two-dimensional image and light-transmissive. The surrounding section is transparent or semi-transparent because the surrounding section should not obstruct the object image P created on the imaging plane 30 when the viewer sees the object image P. Since the viewer can easily focus the second background 31, the viewer perceives that the object image P (real image) of the first reversal film 10a projects from the first background image of the second reversal film 50, like a three-dimensional presentation, as shown in FIG. 6B. It should be noted that the third display 60 may be located either between the imaging plane 30 and the second display 50 or between the imaging plane 30 and the viewer, as long as the viewer's eyes can easily focus on the second background image 31 of the third display 60. In general, therefore, the third display 60 is located near the imaging plane 30. The second background image 31 is part of a boat, and the object image P is a dolphin and an erected image.

Figure 6C:
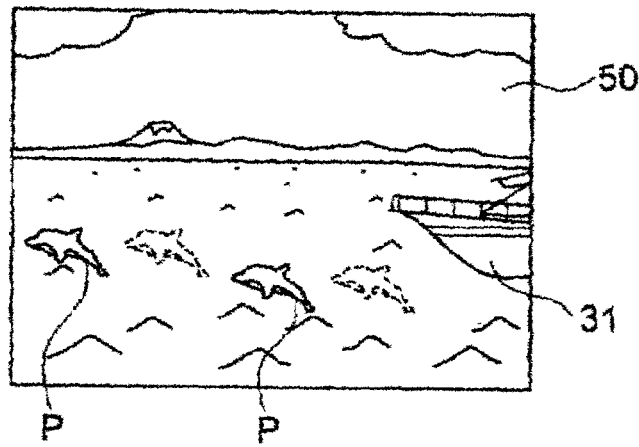
FIG. 6C illustrates a modification in which some images move in the combined image of FIG. 6B.
Figure 7:
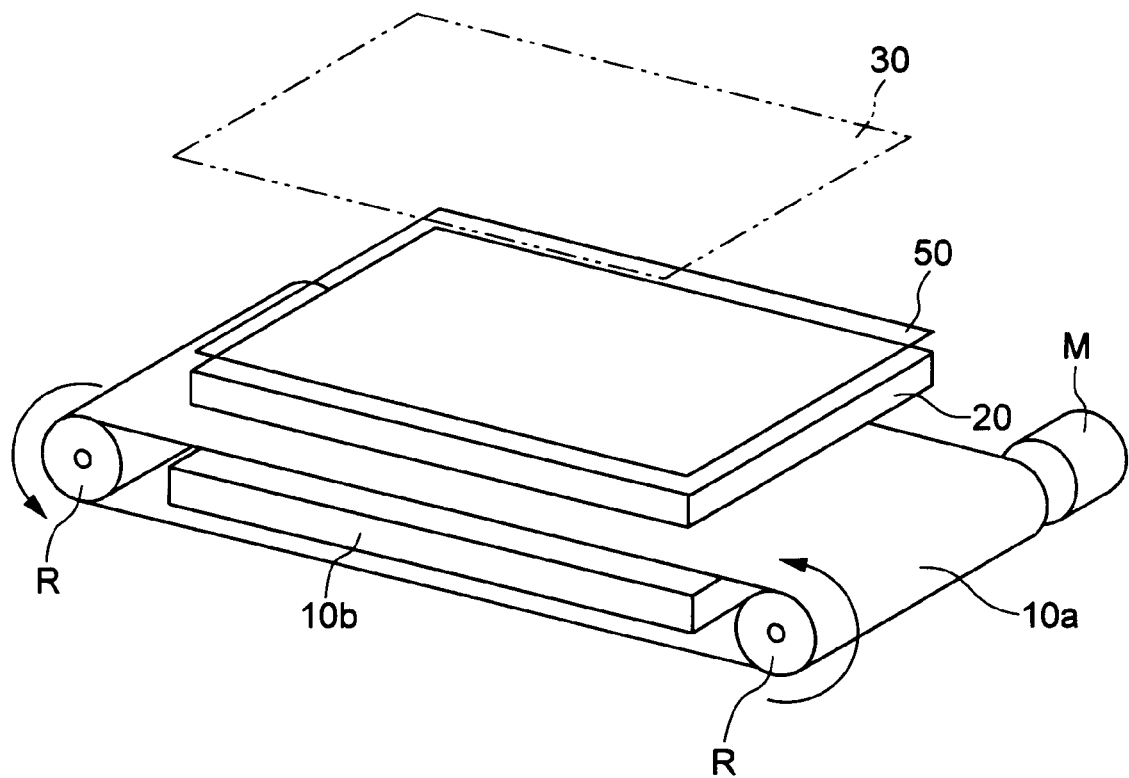
FIG. 7 illustrates a mechanism for moving the images, which is used for the FIG. 6C modification.

Referring to FIG. 6C, it is possible to move the "floating" object image P. The two dolphins P have moved from the phantom positions in this drawing. In the image display apparatus shown in FIG. 7, the image transmitting panel 20 and the first reversal film 10a are disposed in parallel to each other. The image transmitting panel 20 forms the imaging plane 30 beyond the second display 50 (i.e., between the second display 50 and the viewer). The first reversal film 10a is in the form of an endless tape, and engaged over two parallel rolls (drive and driven rolls) R. As the drive roll R is rotated by a motor M, only the object images P move. The rolls R and motor M constitute a film drive mechanism for moving the object image P. The film drive mechanism is a mechanism for translating the first reversal film 10a relative to the image transmitting panel 20. The image transmitting panel 20 is stationary. The parallel relationship between the first reversal film 10a and the image transmitting panel 20 is maintained while the first reversal film 10a is being translated. It should be noted that the film drive mechanism is not limited to the illustrated one. Any suitable mechanism may be utilized as long as the mechanism is able to translate the first reversal film 10a of the first display 10 relative to the image transmitting panel 20 and able to maintain the distance (or parallel relationship) between the first reversal film 10a and the image transmitting panel 20. The film drive mechanism can change the dolphin P to another image such as a person swimming after the dolphin when the film drive mechanism moves the first reversal film 10a. The "another image" may include words, characters, letters, marks, signs and symbols. For example, therefore, it is possible to show a moving advertisement.

Figure 8:
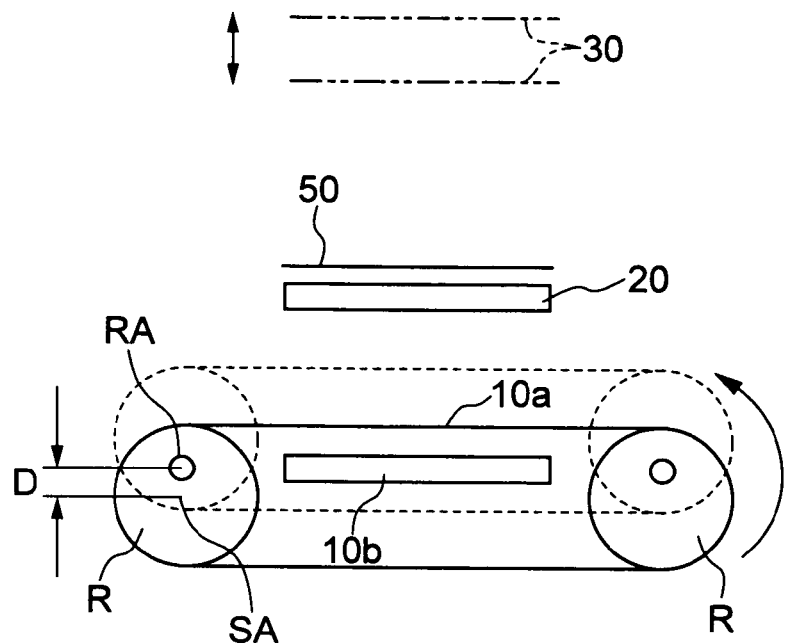
FIG. 8 illustrates a modification of the mechanism shown in FIG. 7.

A modification of the film drive mechanism for showing a moving object image P will be described with reference to FIG. 8. This film drive mechanism can also change the distance between the first reversal film 10a and the image transmitting panel 20 while the first reversal film 10a is circulating. The film drive mechanism includes a pair of parallel rolls R and the endless-tape type reversal film 10a engaged over the rolls R. Each roll R has a rotation center RA, which is offset from the center SA of the roll R by an amount of D. As the rolls R rotate, the first reversal film 10a approaches and moves apart from the image transmitting panel 20 in a repeated manner. At the same time, the first reversal film 10a rotates. In FIG. 8, the solid line indicates the first reversal film 10a at a position furthest from the image transmitting panel 20, and the phantom line indicates the first reversal film 10a at a position closest to the image transmitting panel 20. Other elements of the film drive mechanism are the same as the film drive mechanism shown in FIG. 7. As the distance between the first reversal film 10a and the image transmitting panel 20 changes, the position of the imaging plane 30 moves back and forth as indicated by the double arrow. It is therefore possible to translate the image P in the width direction of the display apparatus horizontally while moving the image P back and forth within the depth of focus of the micro lens array 22. The parallel relationship between the first reversal film 10a and the image transmitting panel 20 is maintained. It should be noted that the two rolls R may be driven in a different manner or the amount of offset D for the right roll may be different from that for the left roll. This will destroy the parallel relationship between the first reversal film 10a and the image transmitting panel 20 when the first reversal film 10a approaches and moves apart from the image transmitting panel 20. The amount of offset D from the roll center SA to the rotation center RA is determined such that the moving first reversal film 10a remains in the depth of field of the micro lens array 22.

Figure 9:
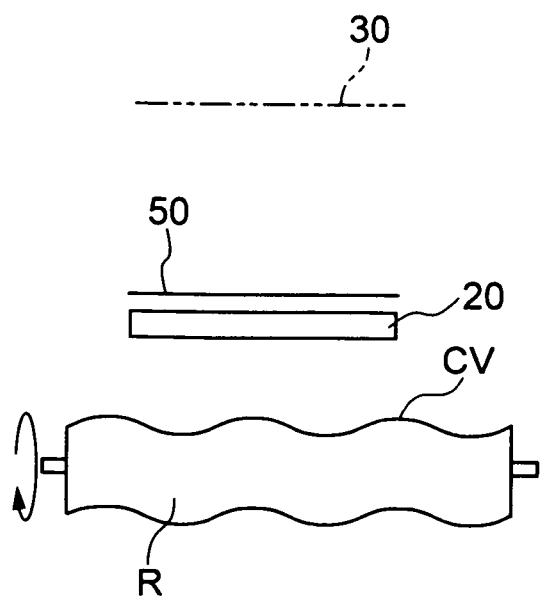
FIG. 9 illustrates another modification of the mechanism shown in FIG. 7.

A still further modification of the film drive mechanism is illustrated in FIG. 9. This film drive mechanism can change the distance between the first reversal film 10a and the image transmitting panel 20 in a random (concave-convex) manner. A basic structure of the film drive mechanism shown in FIG. 9 is the same as that shown in FIG. 7, but the shape of the roll R is different. As depicted in FIG. 9, at least one of the rolls R has a plurality of projections CV. Consequently, some portions of the first reversal film 10a (not shown in FIG. 9) move closer to (or apart from) the image transmitting panel 20 as the rolls R rotate. This film drive mechanism shifts the imaging plane 30 back and forth within the depth of focus of the micro lens array 22. The parallel relationship between the first reversal film 10a and the image transmitting panel 20 is generally maintained. The height of the projection CV on the roll R is determined such that the first reversal film 10a remains within the depth of field of the micro lens array 22.

Figure 10:
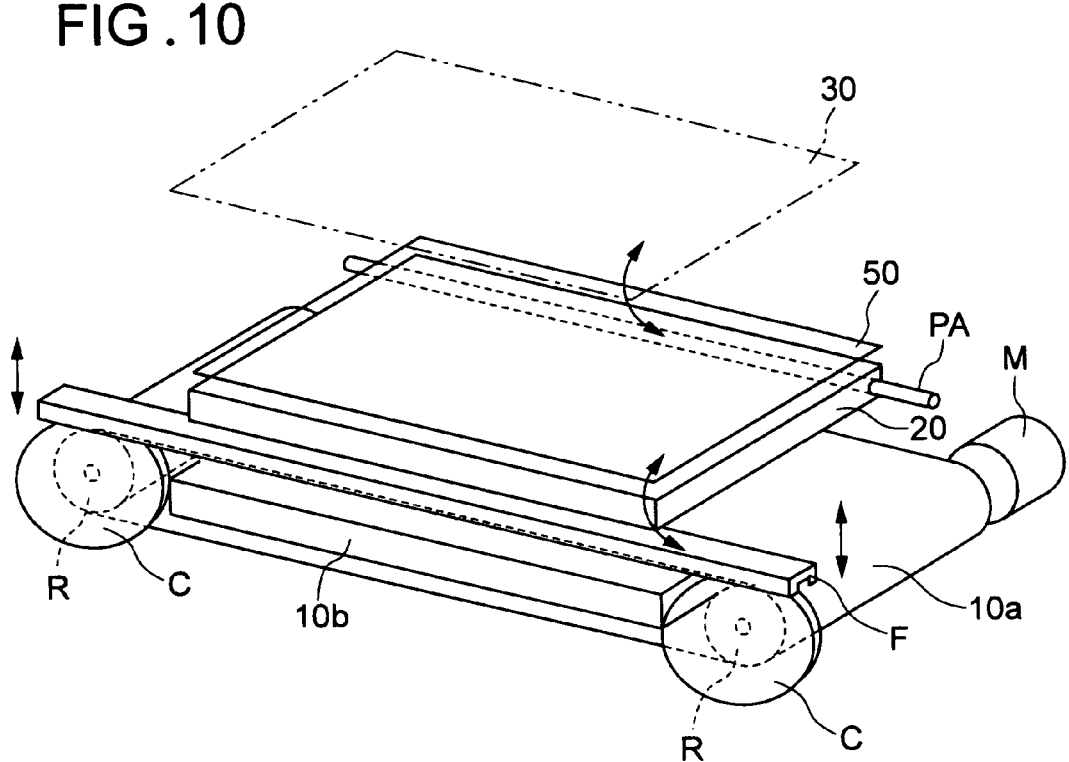
FIG. 10 illustrates still another modification of the mechanism shown in FIG. 7.

Another modification will be described with reference to FIG. 10. This modification is also compared with FIG. 7. A mechanism for pivoting the image transmitting panel 20 relative to the first reversal film 10a is provided in this modification whereas the image transmitting panel 20 is stationary in FIG. 7. The pivoting mechanism includes two disc cams C attached to the two rolls R, respectively. The cam C is an eccentric cam. A single follower F spans the cams C, and an edge of the image transmitting panel 20 rests on the follower F. The opposite edge of the image transmitting panel 20 has a rod PA, which serves as a pivot axis. The follower F contacts the cams C and moves together with the cams C. As the rolls R rotate, the cams C push (lift) the follower F up and down as indicated by the vertical double arrow. As a result, the follower F causes the image transmitting panel 20 to pivot about the axis PA, as indicated by the lower arcuate double arrow. Therefore, the distance between the image transmitting panel 20 and the first reversal film 10a can be partially varied by the pivoting mechanism. When the distance between the image transmitting panel 20 and the first reversal film 10a changes, the imaging plane 30 moves back and forth correspondingly as indicated by the upper arcuate double arrow. The object image P on the imaging plane 30 moves back and forth within the depth of focus of the micro lens array 22 while the first reversal film 10a moves to the left from the right. An amount of eccentricity of the disc cam C (i.e., deviation from the center of the cam to the rotation center of the cam) is determined such that the first reversal film 10a remains within the depth of the field of the micro lens array 22. The follower F is an elongated member having a groove along the length of the follower F. The peripheries of the cams C are received (engaged) in the groove of the follower F.

Figure 11:
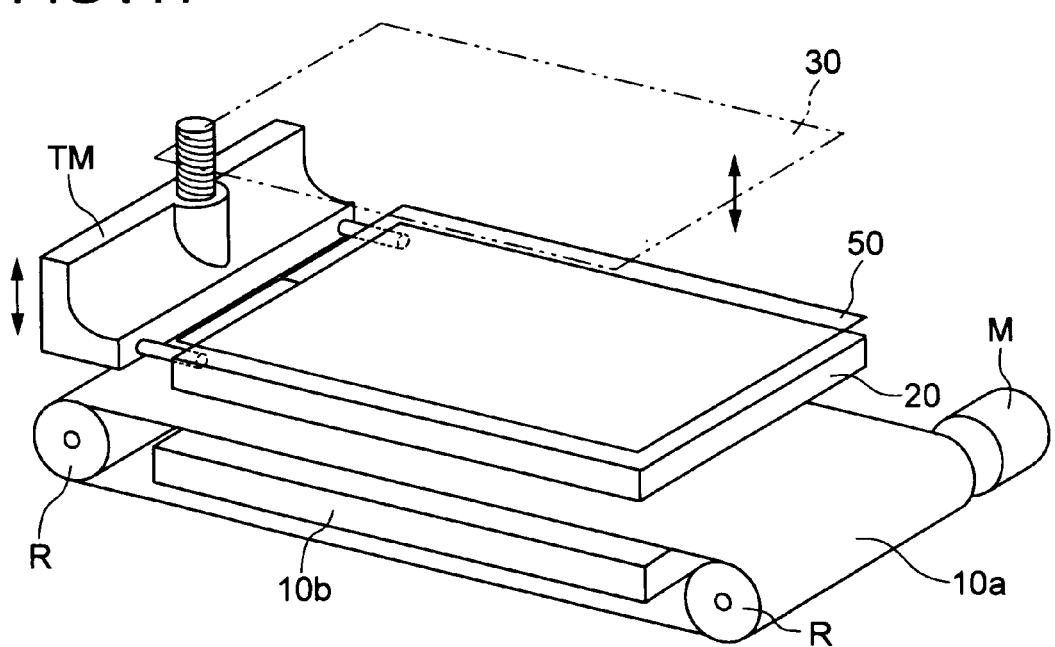
FIG. 11 illustrates yet another modification of the mechanism shown in FIG. 7.

Yet another modification is illustrated in FIG. 11. A mechanism TM for moving the image transmitting panel 20 relative to the first reversal film 10a, as indicated by the left double arrow, is provided in this modification. This modification is compared with FIG. 7 in which the image transmitting panel 20 is not movable. As shown in FIG. 11, the mechanism TM is attached to the side edge of the image transmitting panel 20 such that the image transmitting panel 20 can move closer to and apart from the first reversal film 10a. The mechanism TM is a screw mechanism. The parallel relationship between the image transmitting panel 20 and the first reversal film 10a is always maintained. As the image transmitting panel 20 is moved by the mechanism TM, the imaging plane 30 is moved correspondingly as indicated by the right double arrow. The movement of the imaging plane 30 is limited to an extent that the object image P does not go beyond the depth of the focus of the micro lens array 22. The movement of the image transmitting panel 20 is determined such that the first reversal film 10a remains within the depth of field of the micro lens array 22.

As described above, the second background image 31 is provided near (in front of or behind) the imaging plane 30, on which the object image P is created, in a manner not to obstruct the displaying of the object image P, and the mechanism for moving the object image P is provided in the second embodiment (FIGS. 4 to 11). Therefore, the viewer feels that the two-dimensional image P is stereoscopic although the two-dimensional image P itself does not contain parallax information.

It should be noted that the solid plate member 9 to accommodate the imaging plane 30 may be replaced by a hollow member such as a transparent casing made from acrylic. The casing is transparent at least in the direction X in FIG. 5. Alternatively, the transparent plate member 9 may be replaced by a rectangular parallelepiped frame. The frame has no walls at least in the direction X. Inside the casing or frame, a miniature of a garden, house, creek and the like may be placed. Then, a middle-distance or far-distance background may be written on the second display 50, and the moving picture P (e.g., person or automobile) is projected in the imaging plane 30. This can be a stereoscopic diorama.

Figure 12:
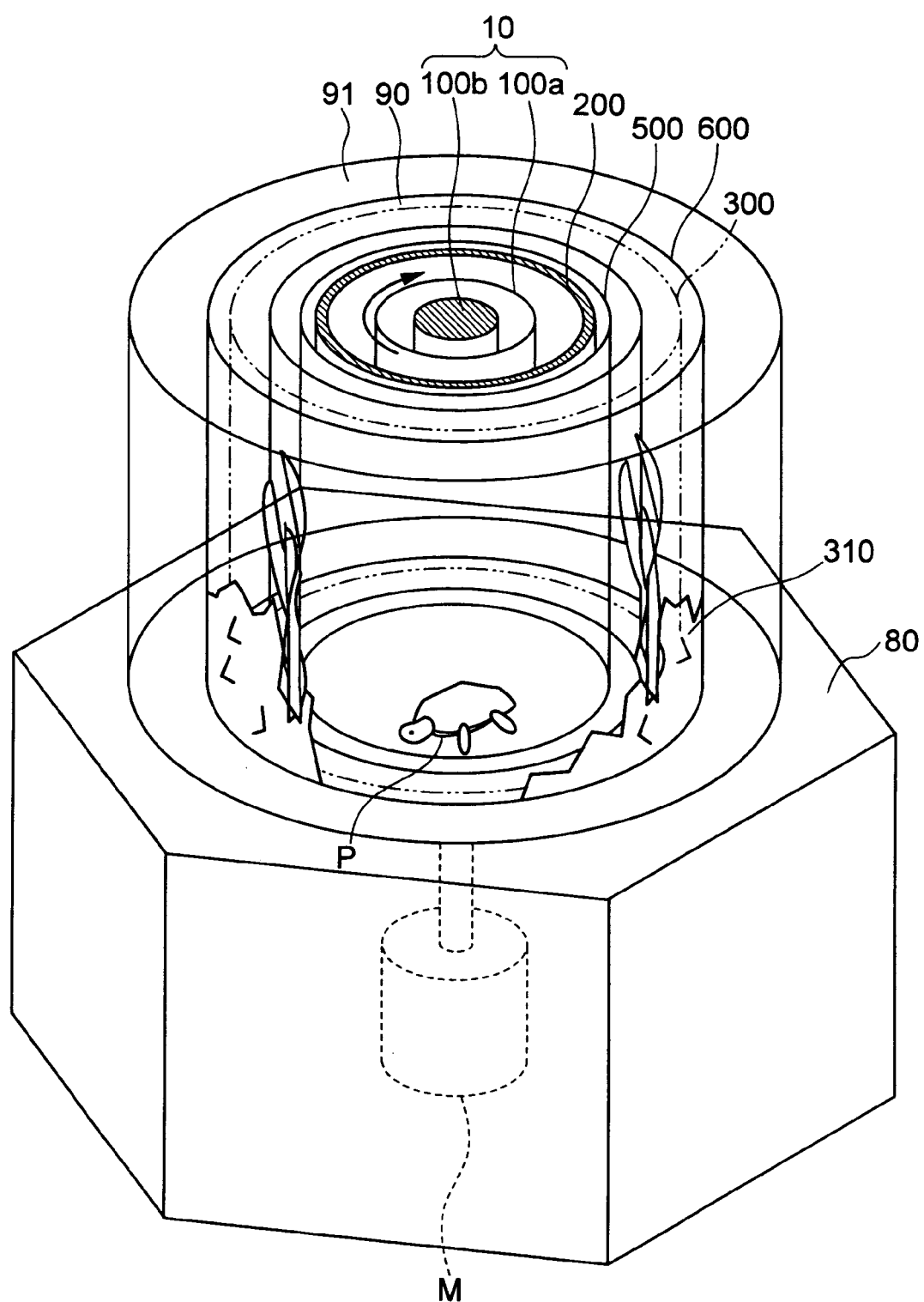
FIG. 12 illustrates a schematic perspective view of an image display apparatus according to a third embodiment of the present invention.

A third embodiment of the present invention will be described with reference to FIG. 12. Similar terminology is used to describe similar elements in the first, second and third embodiments.

The image display apparatus of the third embodiment is situated on a hexagon base 80. A first reversal film 100a has a cylindrical shape and stands on the base 80. The first reversal film 100a is coaxial to the base 80. A back light 100b also has a cylindrical shape and coaxially surrounds the first reversal film 100a on the base 80. The first reversal film 100a and back light 100b constitute the first display 10. An image transmitting panel 200 having a cylindrical shape surrounds the back light 100b (or the first display 10) coaxially. It should be noted that the first display 10 is not limited to the combination of the reversal film 100a and back light 100b to illuminate the reversal film. For example, an organic electroluminescence display may be used as the first display 10.

The image surface of the first display 10 is the cylindrical reversal film 100a, and is located within the depth of field of a micro lens array (not shown) of the image transmitting panel 200 around the focus plane of the micro lens array. The image transmitting panel 200 has a thickness, and the micro lens array is housed in the image transmitting panel 200. A second reversal film 500 is a second display to present a background image. The second reversal film 500 is also cylindrical, and coaxially surrounds the image transmitting panel 200 on the base 80. It should be noted that a transparent adhesive may be applied to the second reversal film 500 to attach the second reversal film 500 to the image transmitting panel 200. The second reversal film 500 is detachable or replaceable.

The image present on the first display 10 is projected on an imaging plane 300 at or near the focus plane of the micro lens array. Then, a viewer can see a real image P (e.g., a turtle) on the imaging plane 300. The imaging plane 300 is cylindrical.

A transparent, cylindrical member 90 coaxially surrounds the second reversal film 500. The cylindrical member 90 is a hollow member, and is acrylic. The cylindrical block 90 has a thickness sufficient to accommodate the imaging plane 300 created by the micro lens array of the image transmitting panel 200. Therefore, the viewer feels that the image P is floating in the transparent block 90. The location of the transparent block 90 is determined such that the focus plane of the micro lens array exists within the confinement of the transparent block 90. Another (or outer) transparent block 91 coaxially surrounds the transparent block 91. The outer transparent block 91 is also made from acrylic. The outer transparent block 91 is joined with the inner transparent block 90 at or near the imaging plane 300, with a third display 600 being interposed. The third display 600 presents a second background image 310. The third display 600 is, for example, a cylindrical reversal film. Since the viewer can easily focus on the second background image 310, the viewer feels that the real image P derived from the first reversal film 100a projects or floats from the first background image derived from the second reversal film 500.

It should be noted that a motor M may be provided for rotating the first reversal film 100a. The motor M is a film drive mechanism to move the image P only. The film drive mechanism provides a rotating display function (a merry-go-round type display function). A motor shaft extends coaxially to the back light 100b (or the first display 10). The motor M is placed inside the base 80 so that the motor M is concealed from the viewer.

Figure 13:
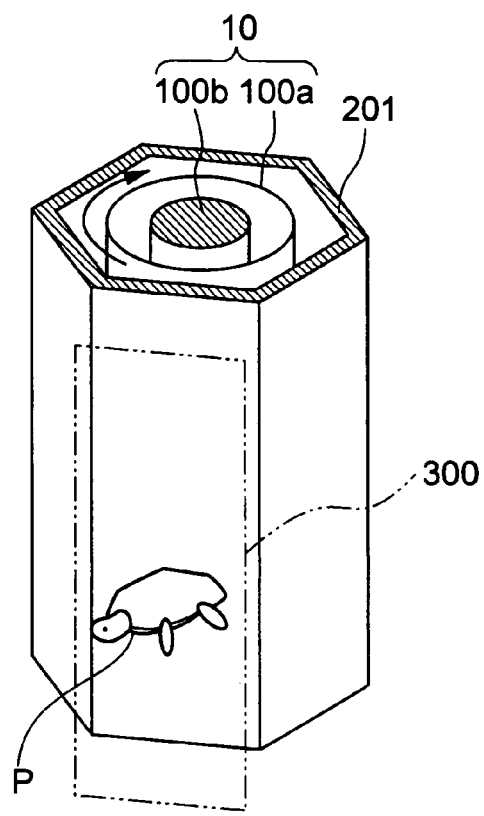
FIG. 13 illustrates major elements in a modification of the third embodiment.

It should be noted that the image transmitting panel 200 having a cylindrical shape may be replaced by another image transmitting panel 201 having a regular polygonal shape as shown in FIG. 13.

Figure 14:
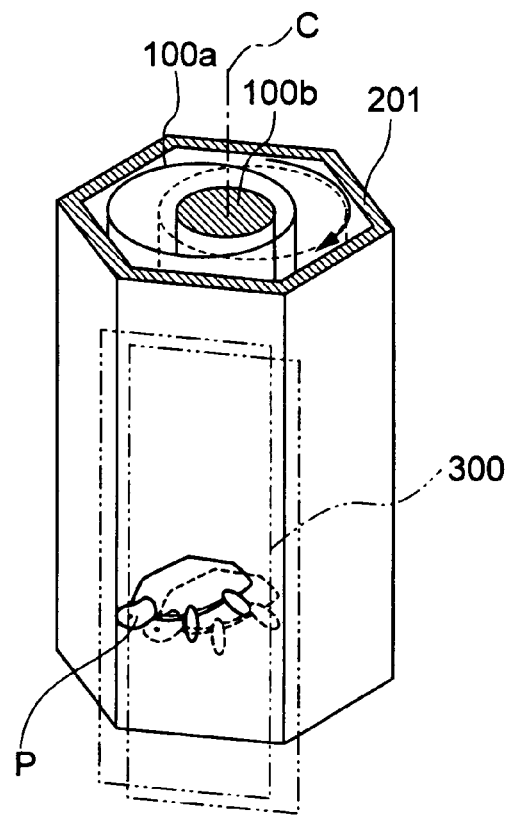
FIG. 14 illustrates major elements in another modification of the third embodiment.

It should also be noted that the first reversal film 100a may not be located coaxially to the back light 100b as shown in FIG. 14. The back light 100b is coaxial to the motor shaft center axis C. When the motor M (FIG. 12) is activated, the back light 100b and the first reversal film 100a rotate about the motor shaft center axis C. However, the center line of the first reversal film 100a is offset from the axis C so that the first reversal film 100a rotates eccentrically as indicated by the arrow. The distance between the image transmitting panel 200 (or 201) and the first reversal film 100a varies upon the rotation of the first reversal film 100a. As a result, the imaging plane 300 (or the image P thereon) moves back and forth within the depth of focus of the micro lens array of the image transmitting panel 200 (or 201). An amount of movement of the first reversal film 100a is limited within the depth of field of the micro lens array.

This application is based on a Japanese patent application No. 2001-357073, and the entire disclosure thereof is incorporated herein by reference.

What is claimed is:

1. An apparatus comprising:
a first display including a first planar image surface to present a two-dimensional image including an object image;
an image transmitting panel in parallel to the first image surface and including a micro lens array for creating an imaging plane to show a real image of the two-dimensional image in a space opposite the first display, the micro lens array including a plurality of lenses and having an effective area greater than the object image; and
a second display between the imaging plane and the micro lens array for presenting a background image, the second display including at least one of a transparent area and a semi-transparent area to allow formation of the real image on the imaging plane,
wherein the first display includes a back light, and a reversal film nlaced between the back light and the image transmitting panel to present the two-dimensional image.

2. The apparatus according to claim 1, wherein the micro lens array comprises a micro convex lens plate including a plurality of pairs of convex lenses arranged two-dimensionally such that optical axes of the plurality of pairs of lenses extend in parallel to each other, two lenses in each pair of lenses being coaxial to each other.

3. The apparatus according to claim 2, wherein the micro lens array creates an erected image on the imaging plane.

4. The apparatus according to claim 1, further including a film drive mechanism for translating the reversal film relative to the image transmitting panel, with a distance between the reversal film and the image transmitting panel being substantially maintained.

5. The apparatus according to claim 4 further including a second film drive mechanism for moving the reversal film relative to the image transmitting panel to change the distance between the reversal film and the image transmitting panel.

6. The apparatus according to claim 4 further including a second film drive mechanism for partially changing the distance between the reversal film and the image transmitting panel.

7. The apparatus according to claim 4 further including a mechanism for pivoting the image transmitting panel relative to the reversal film.

8. The apparatus according to claim 4 further including a panel drive mechanism for moving the image transmitting panel relative to the reversal film to change the distance between the reversal film and the image transmitting panel.

9. The apparatus according to claim 1, further including a third display located at one of the imaging plane and between the imaging plane and the second display for presenting a second background image including at least one of a transparent area and a semi-transparent area to facilitate recognition of the real image of the two-dimensional image.

10. The apparatus according to claim 9 further including a transparent member for supporting the third display.

11. The apparatus according to claim 10, wherein the reversal film, the image transmitting panel and the second display are arranged coaxially with a hollow cylindrical shape and an increasing diameter, respectively.

12. The apparatus according to claim 11, wherein the transparent member comprises a hollow cylindrical shape and is coaxial to the image transmitting panel.

13. The apparatus according to claim 11, wherein the transparent member comprises acrylic.

14. The apparatus according to claim 1, wherein the first display includes one of an organic electroluminescence display, a color LCD, a CRT display and a plasma display panel.

15. The apparatus according to claim 1, wherein the back light, the reversal film and the image transmitting panel are arranged coaxially with a cylindrical shape and an increasing diameter, respectively, and the apparatus further includes a motor to rotate the reversal film coaxially relative to the image transmitting panel.

16. The apparatus according to claim 1, wherein the back light, the reversal film and the image transmitting panel comprise a cylindrical shape with an increasing diameter, respectively, the reversal film being located eccentrically to the image transmitting panel, and the apparatus further includes a motor to rotate the reversal film eccentrically relative to the image transmitting panel.

17. The apparatus according to claim 1, further comprising:
a third display disposed at one of the imaging plane, between the imaging plane and the second display, and on a viewing side of the imaging plane, for presenting a second background image.

18. The apparatus according to claim 17, wherein said third display includes at least one of a transparent area and a semi-transparent area to facilitate recognition of the real image of the two-dimensional image.

19. The apparatus according to claim 1, wherein the second display is at least one of in contact with the micro lens array, adhered to the micro lens array, mechanically attached to the micro lens array, laminated on the micro lens array, and spaced apart from the micro lens array.

20. An apparatus comprising:
a first display including a first planar image surface to present a two-dimensional image including an object image;
an image transmitting panel in parallel to the first image surface and including a micro lens array for creating an imaging plane to show a real image of the two-dimensional image in a space opposite the first display;
a second display between the imaging plane and the micro lens array for presenting a background image; and
a third display disposed at one of the location of the imaging plane, between the imaging plane and the second display, and on a viewing side of the imaging plane, for presenting a second background image.

21. The apparatus according to claim 20, wherein the micro lens array comprises a plurality of lenses and includes an effective area greater than the object image.

22. The apparatus according to claim 20, wherein the second display includes at least one of a transparent area and a semi-transparent area to allow formation of the real image on the imaging plane.

23. The apparatus according to claim 20, wherein said third display includes at least one of a transparent area and a semi-transparent area to facilitate recognition of the real image of the two-dimensional image.

24. The apparatus according to claim 20, wherein said viewing side of the imaging plane comprises an opposite side of the imaging plane from the second display.

25. An apparatus comprising:
a first display including a first planar image surface to present a two-dimensional image including an object image;
an image transmitting panel in parallel to the first image surface and including a micro lens array for creating an imaging plane to show a real image of the two-dimensional image in a space opposite the first display, the micro lens array including a plurality of lenses and having an effective area greater than the object image; and
a second display between the imaging plane and the micro lens array for presenting a background image, the second display including at least one of a transparent area and a semi-transparent area to allow formation of the real image on the imaging plane,
wherein the first display includes a back light, and a transparent film placed between the back light and the image transmitting panel to present the two-dimensional image.

* * * * *

UNITED STATES PATENT AND TRADEMARK OFFICE
CERTIFICATE OF CORRECTION

| | | |
|---|---|---|
| PATENT NO. | : 6,972,738 B2 | Page 1 of 1 |
| APPLICATION NO. | : 10/299862 | |
| DATED | : December 6, 2005 | |
| INVENTOR(S) | : Ishikawa et al. | |

It is certified that error appears in the above-identified patent and that said Letters Patent is hereby corrected as shown below:

Column 10, line 43:
    Change the word "nplaced" to "placed" in claim 1.

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,972,738 B2  Page 1 of 1
APPLICATION NO. : 10/299862
DATED : December 6, 2005
INVENTOR(S) : Ishikawa et al.

It is certified that error appears in the above-identified patent and that said Letters Patent is hereby corrected as shown below:

Change the word "nplaced" to "placed" in claim 1, line 43.

Signed and Sealed this

Twenty-second Day of August, 2006

JON W. DUDAS
*Director of the United States Patent and Trademark Office*